United States Patent Office 3,165,502
Patented Jan. 12, 1965

3,165,502
NEOPENTYL HALIDE ESTER OF α,β-UNSATU-
RATED CARBOXYLIC ACID
John R. Caldwell, Kingsport, Tenn., assignor to Eastman
Kodak Company, Rochester, N.Y., a corporation of
New Jersey
No Drawing. Filed Aug. 16, 1962, Ser. No. 217,275
12 Claims. (Cl. 260—86.1)

This invention relates to new halogenated compounds, to resinous polymers thereof, and to a process for preparing these compounds.

The new monomers of the invention are represented by the following formulas:

(1)
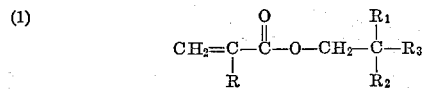

(2)
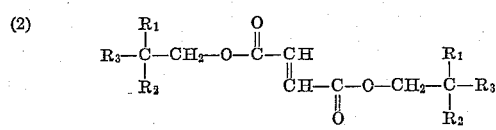

(3)
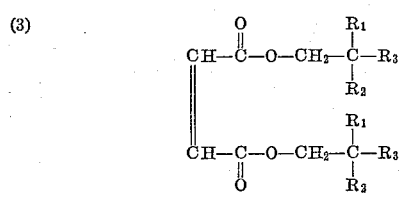

and (4)
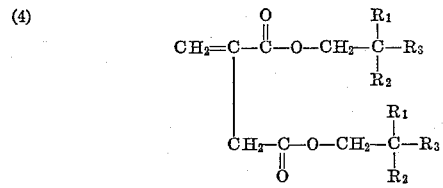

wherein R represents hydrogen or a methyl group, $R_1$ represents a chlorine or bromine substituted methyl, ethyl or phenyl group, $R_2$ represents a methyl group of a chlorine or bromine substituted methyl group or a chloro- or bromophenyl group, and $R_3$ represents in addition to the values specified for $R_1$ and $R_2$ an unsubstituted cyclohexyl group. Typical structures for $R_1$ and $R_2$ are —CH$_2$Cl, —CHCl$_2$, —CCl$_3$, —CH ClCH$_3$ and the corresponding bromine derivatives. The above newly described compounds are especially useful for the preparation of resinous homopolymers and copolymers which are characterized by having softening points in the range of about from 125 to 200° C., or more, and having outstanding stability toward hydroylsis and thermal decomposition. Some members are self-extinguishing. This is a surprising result in view of the fact that most, if not all, of the previously known vinyl polymers contain the halogen in a labile or reactive form that permits thermal decomposition or hydrolysis to take place altogether too readily. This instability of such prior art polymers has presented a series problem and the art contains numerous references to various types of stabilizers used in an effort to minimize decomposition. However, the problem has not been completely solved even by the use of stabilizers so that the halogenated polymers previously known have had but very limited applications. The highly advantageous stability of the compounds of the invention is believed to stem from the presence therein of the halogen groups in a neopentyl type of structure. The polymers of the invention are useful for the manufacture of high stability films, protective coatings, fibers and molded articles. In general, those members containing more than about 30% of halogen by weight show greatly reduced flammability, as compared with prior art polymers, and are self-extinguishing.

It is, accordingly, an object of the invention to provide a new class of unsaturated esters containing halogen groups in a neopentyl structural relationship. Another object is to provide resinous polymers and shaped articles of the same. Another object is to provide processes for preparing the said esters and polymers. Other objects will become apparent from the description and the example set forth hereinafter.

In accordance with the invention, I prepare the compounds defined by the above structural formulas by esterifying a suitable α,β-unsaturated carboxylic acid such as acrylic methacrylic, maleic or itaconic acid or anhydrides and acid halides thereof, or fumaric acid or acid halide thereof, with certain alcohols containing neopentyl halogen groups and coming within the general formula:

(5)

wherein $R_1$, $R_2$ and $R_3$ are as previously defined. Where the free acid is employed, the reaction is carried out in the conventional manner by refluxing the reactants in the presence of a suitable esterification catalyst and isolating the ester product. Typical alcohols coming within the scope of the above Formula 5 include: β,β,β-tri-(chloromethyl)-ethanol, β,β,β-tri(bromomethyl)ethanol, β,β - di(chloromethyl)propanol, β,β - di(bromomethyl)propanol, β-chloromethyl-β-trichloromethyl-propanol, β-bromomethyl-β-tribromomethyl - propanol, β - chloromethyl - β - dibromomethyl-propanol, and the like. Other halogenated neopentyl alcohols that are also useful are represented by the structures:

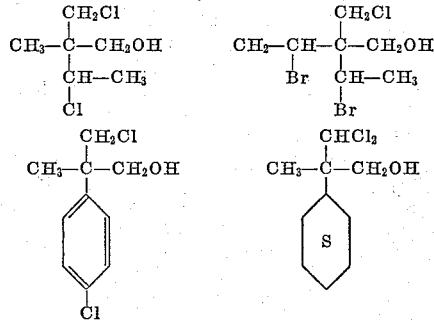

and (CH$_2$Cl)$_3$CCH$_2$CH$_2$OH. Many of these intermediate alcohols can be derived from pentaerythritol by the action thereon of hydrogen chloride and hydrogen bromide or sulfuryl chloride. For example, the preparation of β,β,β-tri(chloromethyl)ethanol is described in the J. Amer. Chem. Soc., 67, 942 (1945); and 79, 953 (1957).

The polymerizations of the new compounds of the invention alone to form resinous homopolymers or conjointly with one or more other monoethyleneically unsaturated polymerizable organic compounds containing a —CH=C< group, but preferably a vinyl group CH$_2$=C<, to form resinous copolymers are accelerated by heat, by actinic light and by polymerization catalysts which are known to promote the polymerizations of vinyl and other unsaturated compounds such as a peroxy type of catalyst represented, for example, by benzoyl peroxide, acetyl peroxide, tertiary butyl hydroperoxide, hydrogen peroxide, ammonium persulfate, sodium persulfate, potassium persulfate, persulfuric acid, sodium perborate, and other alkali-metal perborates, the water-soluble salts of percarbonic acid, the water-soluble salts of perphosphoric acid, etc. Other useful polymerization catalysts include boron trifluoride and various azo-bis-nitriles. Mixtures of one or more of the mentioned catalysts can be employed. The total quantity of such catalyst can vary widely but from about 0.1 to 3%, based on the weight of the monomer to be polymerized, is efficacious. Mass, suspension or solution methods may be used. In the case of suspension polymerization in a nonsolvent medium such as water, the use of an activating agent such as sodium bisulfite or metabisulfite is highly advantageous. The amount of activating agent is of the same general order as the peroxy catalyst. Chain regulators such as alkyl mercaptans can also be used, if desired, in conjunction with the catalysts in above mentioned aqueous system. The temperature of the polymerizations can vary widely, but preferably from about 20° to 100° C., preferably under normal atmospheric conditions, although pressures substantially above or below normal atmospheric can also be employed.

Suitable other unsaturates for preparing the resinous copolymers of the invention include, for example, vinyl and isopropenyl esters of saturated fatty acids of 1 to 18 carbon atoms, e.g. vinyl acetate, isopropenyl acetate, vinyl butyrate, vinyl stearate, etc., vinyl esters of aromatic carboxylic acids, e.g. vinyl benzoate, styrene, etc., vinyl chloride, vinylidene chloride, N-vinyl pyrrolidone, the vinylpyridines, acrylic acid and its anhydride, amide, N-alkyl amides, nitrile and the methyl, ethyl, butyl, benzyl and phenyl esters, etc., the corresponding derivatives of methacrylic acid, etc., alkyl fumarates, alkyl maleates, alkyl citraconates, and the like. The resinous copolymers of the invention can contain variable amounts of each comonomer, but preferably from 25 to 95% by weight of at least one monomeric ester of the invention and from 75 to 5% by weight of at least one of the above mentioned other unsaturates. These copolymers have been found to contain approximately the same proportion of constituents as were present in the starting polymerization mixtures.

The following examples will serve further to illustrate the novel monomers and polymers of the invention and the manner of their preparations.

*Example 1*

19.1 g. (0.1 mole) of β,β,β-tri(chloromethyl)ethanol were heated with a 10% molar excess of acrylic anhydride at 100° C. for 6 hours in the presence of pyridine as catalyst and a trace of sulfur and cuprous chloride as polymerization inhibitors. The reaction mixture was then washed with water and the product separated therefrom by vacuum distillation. It contained approximately 43.4% by weight of chlorine and had the structure:

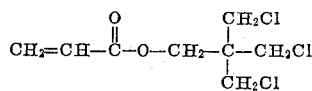

and a boiling point of 90–95°/1.0 mm.

10 g. of the above acrylic ester [β,β,β-tri(chloromethyl)ethyl acrylate] and 0.2 g. of benzoyl peroxide were dissolved in 30 cc. of ethyl acetate, and the solution heated at 60 to 70° C. for a period of 18 hours. The homopolymer was isolated by precipitating the solution in methanol, and filtering and washing the precipitated polymer. It softened at 130 to 145° C. and was readily molded into buttons and melt extruded into filaments. It was very difficult to ignite. Boiling water did not cause any hydrolysis even after prolonged treatment.

In contrast, polymers made at the same time under similar conditions from the prior art 2,3-dichloro-n-propyl-α-chloroacrylate were found to have reactive halogen atoms and were unstable toward hydrolysis. A sample of the polymer was boiled in water for 24 hours. The water gave a strong test for chloride ion when tested with silver nitrate, showing that substantial hydrolysis had occurred. A similar disadvantageous hydrolysis was also found with prior art polymers prepared from chlorinated alkyl acrylates.

*Example 2*

The process of above Example 1 was repeated except that an equivalent amount of methacrylic anhydride was used in place of acrylic anhydride. The homopolymer of β,β,β-tri(chloromethyl)ethyl methacrylate which was obtained softened at 150 to 160° C. and was also found to be useful for the preparation of molded articles such as buttons, filaments, etc., which likewise were stable toward boiling water and aqueous alkalies.

*Example 3*

A homopolymer was prepared from the methacrylic ester of β,β-di(bromomethyl)propanol by heating the monomer with benzoyl peroxide as described in Example 1. It softened at 150 to 160° C. and was difficult to ignite.

*Example 4*

A homopolymer was made from the acrylate ester of β,β,β-tri(bromoethyl)ethanol by heating with benzoyl peroxide as described in Example 1. It was found to be self-extinguishing. Molded articles made therewith in addition to being stable to boiling water also proved to be self-extinguishing.

*Example 5*

A copolymer was made by heating a mixture of 1 mole of isopropenyl acetate and 1 mole of di[β,β,β-tri(chloromethyl)ethyl] fumarate in the manner described in Example 1. It softened at 170 to 180° C. and was self-extinguishing.

In place of the isopropenyl acetate in the above example, there may be substituted in like amount any of the mentioned other monoethylenically unsaturated compounds to give generally similar stable and flame-resistant copolymers. Those prepared with acrylonitrile are particularly useful for the preparation of fibers having relatively high softening points and good stability toward heat and alkaline hydrolysis.

In general, all of the homopolymers of the invention are soluble in chlorinated aliphatic hydrocarbon solvents such as methylene chloride, ethyl dichloride, chloroform and tetrachlorethane. In most cases, they are also soluble in benzene, chlorobenzene, toluene and 1,4-dioxane. These solutions or dopes can be spun into fibers, used as protective coatings or coated onto smooth surfaces to give flexible, tough films and sheets that are stable to heat and hydrolysis and are flame resistant, and useful wrapping materials, photographic film supports and other purposes. If desired, various modifying materials may be incorporated such as softeners, fillers, pigments, dyes, etc. As previously indicated, they are also readily molded into shaped articles by compression and injection molding techniques.

*Example 6*

2,2-dimethyl-3-bromopropanol was prepared by treating 2,2-dimethyl-1,3-propanediol with anhydrous HBr. The acrylate and methacrylate esters were prepared as described above; B.P. 78–80°/0.5 mm. and 80–83°/0.5 mm., respectively.

Ten g. of acrylate ester and 0.2 g. benzoyl peroxide were dissolved in 20 cc. of tertiary-butyl alcohol and the solution was heated at 60° for 24 hours. The polymer was isolated by precipitating in water. Films cast from a methylene chloride solution were clear and tough. They were self-extinguishing when held in a flame and then removed. The films had a softening temperature of 120–128° C. Boiling in water for 10 hours caused no decomposition.

The methacrylate ester was polymerized as described above. Films cast from methylene chloride solution were self-extinguishing and softened at 145–150° C.

Copolymers containing 50% or more of the 2,2-dimethyl-3-bromopropyl esters were self-extinguishing. The addition of 2–4% antimony oxide improved the resistance to burning.

The copolymers made with methyl acrylate and methyl methacrylate are of particular value as molding plastics.

*Example 7*

The fumarate, maleate and itaconate esters of 2,2-dimethyl-3-bromopropanol were made by known methods from the alcohol and the respective acids.

One molecular proportion of the fumarate ester and one molecular proportion of vinyl acetate were mixed and 1% benzoyl peroxide was added. The mixture was allowed to stand at 50–60° for 48 hours in a sealed tube. When the glass was broken away, a clear, hard rod was obtained. The polymer was self-extinguishing.

A similar copolymer was made from the maleate ester and vinyl acetate.

A copolymer made from 75 parts of the itaconate ester and 25 parts of methyl acrylate was valuable as a molding plastic.

*Example 8*

Acrylonitrile copolymers were made containing 25–40% by weight of the compounds described in Examples 1, 2, 3, 4, 5, 6 and 7. All of these compositions gave fibers having a hot-bar sticking temperature of 180° C. or higher. They were difficult to ignite and in most cases were self-extinguishing.

The invention has been described in detail with particular reference to preferred embodiments thereof, but it will be understood that variations and modifications can be effected within the spirit and scope of the invention as hereinabove described and as defined in the appended claims.

What I claim is:

1. An unsaturated ester of (1) an $\alpha,\beta$-unsaturated carboxylic acid selected from the group consisting of acrylic acid, methacrylic acid, maleic acid, fumaric acid and itaconic acid, and (2) an alcohol represented by the general structure:

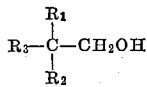

wherein $R_1$, $R_2$ and $R_3$ each represents a member selected from the group consisting of $CH_2Cl$, $CHCl_2$, $CCl_3$, $CHClCH_3$, $CH_2Br$, $CHBr_2$, $CBr_3$, $CHBrCH_3$, $C_6H_4Cl$ and $C_6H_4Br$, and wherein $R_2$ and $R_3$ in addition represent the unsubstituted $CH_3$ group.

2. The compound $\beta,\beta,\beta$-tri(chloromethyl)ethyl acrylate, B.P. 90–95°/1.0 mm.

3. The compound $\beta,\beta,\beta$-tri(chloromethyl)ethyl methacrylate, B.P. 92–96°/1.0 mm.

4. The compound $\beta,\beta$-di(bromomethyl)propyl methacrylate, B.P. 84–85°/0.6 mm.

5. The compound $\beta,\beta,\beta$-tri(bromomethyl)ethyl acryate, B.P. 120–123°/0.1 mm.

6. The compound 2,2-dimethyl-3-bromopropyl acryate, B.P. 78–80°/0.5 mm.

7. A resinous polymer of an unsaturated ester of (1) an $\alpha,\beta$-unsaturated carboxylic acid selected from the group consisting of acrylic acid, methacrylic acid, maleic acid, fumaric acid and itaconic acid, and (2) an alcohol represented by the general structure:

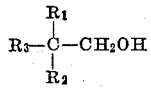

wherein $R_1$, $R_2$ and $R_3$ each represents a member selected from the group consisting of $CH_2Cl$, $CHCl_2$, $CCl_3$, $CHClCH_3$, $CH_2Br$, $CHBr_2$, $CBr_3$, $CHBrCH_3$, $C_6H_4Cl$ and $C_6H_4Br$, and wherein $R_2$ and $R_3$ in addition represent the unsubstituted $CH_3$ group, said polymer having a softening point of from 120 to 200° C.

8. The resinous homopolymer of $\beta,\beta,\beta$-tri(chloromethyl)ethyl acrylate having a softening point of from 120 to 200° C.

9. The resinous homopolymer of $\beta,\beta,\beta$-tri(chloromethyl)ethylmethacrylate having a softening point of from 120 to 200° C.

10. The resinous homopolymer of $\beta,\beta$-di(bromoethyl)propyl methacrylate having a softening point of from 120 to 200° C.

11. The resinous homopolymer of $\beta,\beta,\beta$-tri(bromomethyl)ethyl acrylate having a softening point of from 120 to 200° C.

12. A resinous copolymer of from 50% to 95% by weight of 2,2-dimethyl-3-bromopropyl acrylate and a comonomer selected from the class consisting of methyl acrylate and methyl methacrylate.

References Cited in the file of this patent

UNITED STATES PATENTS

| | | |
|---|---|---|
| 2,947,734 | Halpern et al. | Aug. 2, 1960 |
| 3,023,230 | Baron et al. | Feb. 27, 1962 |

UNITED STATES PATENT OFFICE
CERTIFICATE OF CORRECTION

Patent No. 3,165,502  January 12, 1965

John R. Caldwell

It is hereby certified that error appears in the above numbered patent requiring correction and that the said Letters Patent should read as corrected below.

Column 6, lines 4, 6, 8, 10 and 12, for "$B.P.$", each occurrence, read -- b.p. --; line 8, for "84-85°" read -- 84-86° --; lines 9 and 11, for "acryate", each occurrence, read -- acrylate --; same column 6, line 34, for "(bromoethyl) read -- (bromomethyl) --.

Signed and sealed this 6th day of July 1965.

(SEAL)
Attest:

ERNEST W. SWIDER
Attesting Officer

EDWARD J. BRENNER
Commissioner of Patents